Dec. 18, 1928.
E. R. GILKISON
1,696,113
AUTO CAMP TRAILER
Filed July 6, 1926      4 Sheets-Sheet 1
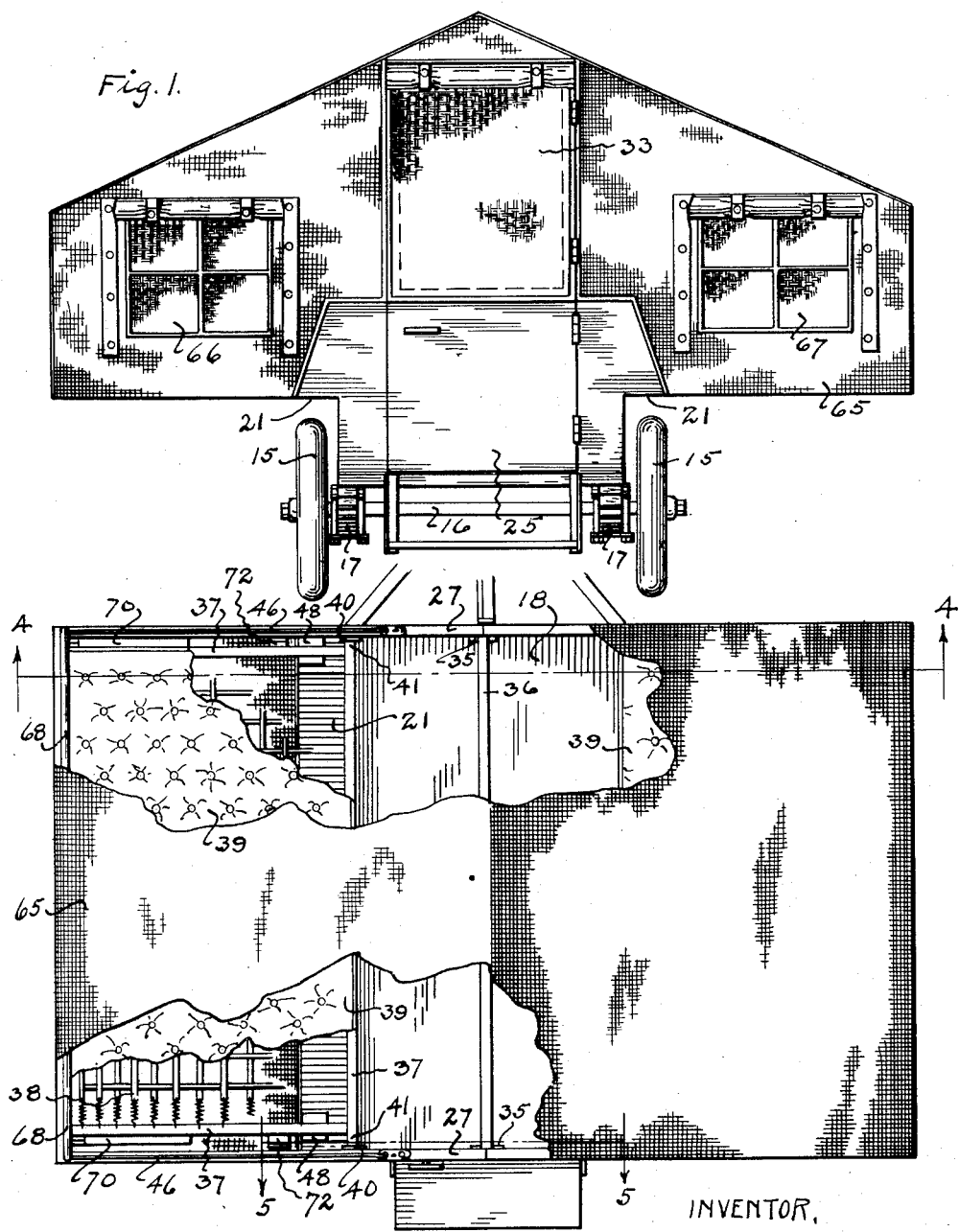

Dec. 18, 1928.  E. R. GILKISON  1,696,113
AUTO CAMP TRAILER
Filed July 6, 1926  4 Sheets-Sheet 2

INVENTOR,
Edward Ray Gilkison,
By Minturn & Minturn,
Attorneys.

Dec. 18, 1928.
E. R. GILKISON
1,696,113
AUTO CAMP TRAILER
Filed July 6, 1926
4 Sheets-Sheet 3
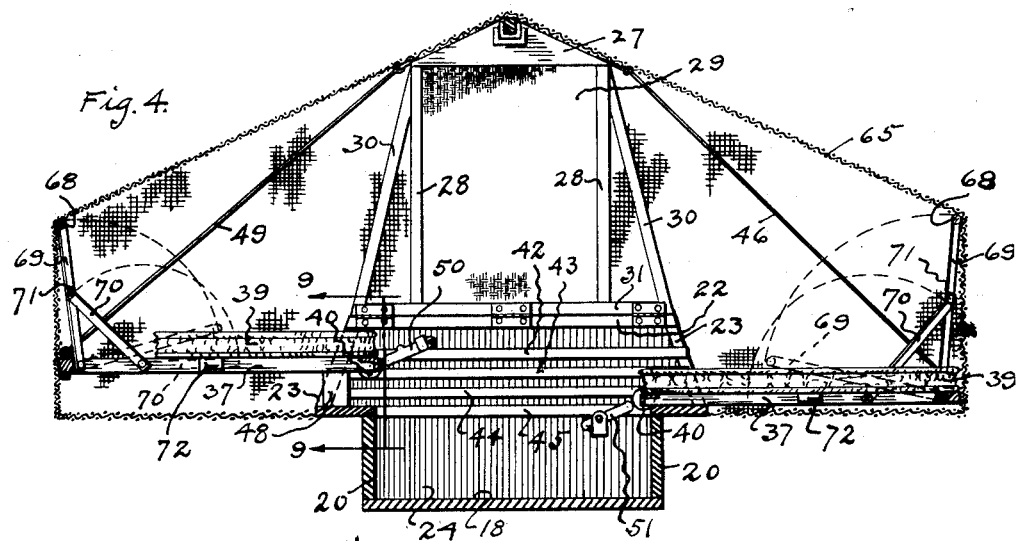
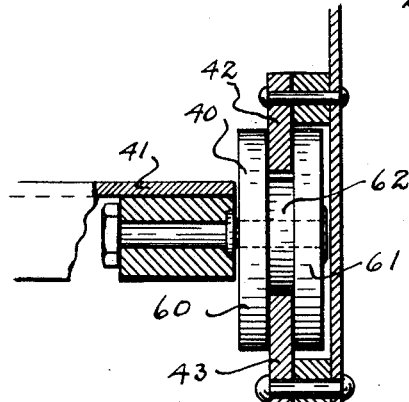
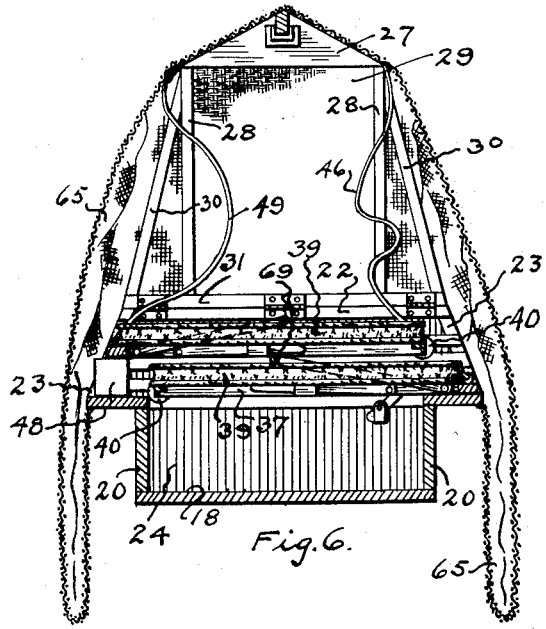
INVENTOR,
Edward Ray Gilkison,
By Minturn & Minturn,
Attorneys.

Dec. 18, 1928.  
E. R. GILKISON  
1,696,113  
AUTO CAMP TRAILER  
Filed July 6, 1926  
4 Sheets-Sheet 4
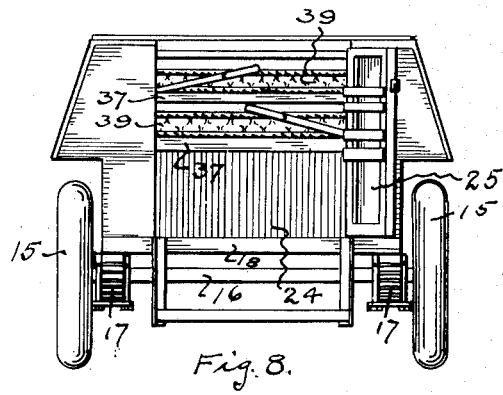
Fig. 8.
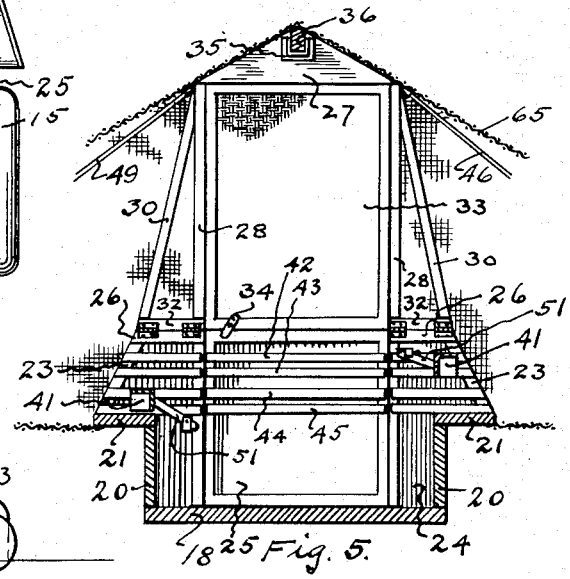
Fig. 5.
Fig. 10.
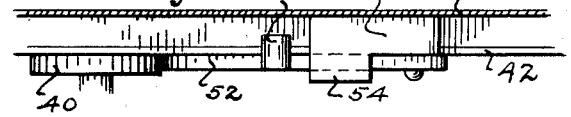
Fig. 11.
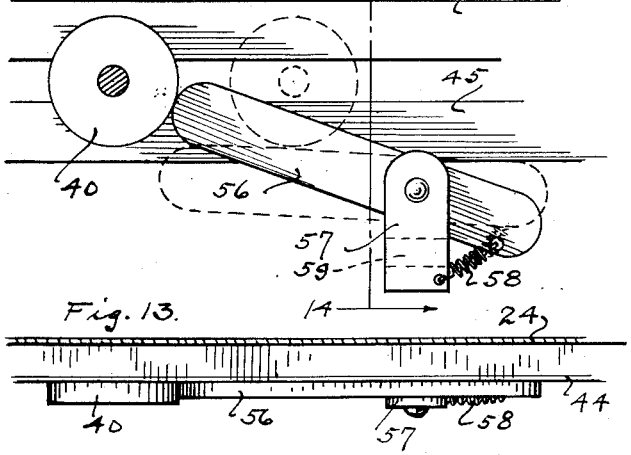
Fig. 12.  
Fig. 13.
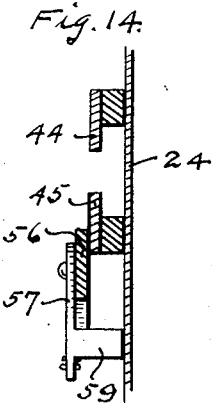
Fig. 14.
INVENTOR,  
Edward Ray Gilkison.  
By Minturn & Minturn,  
Attorneys.

Patented Dec. 18, 1928.

1,696,113

UNITED STATES PATENT OFFICE.

EDWARD RAY GILKISON, OF TERRE HAUTE, INDIANA.

AUTO CAMP TRAILER.

Application filed July 6, 1926. Serial No. 120,645.

This invention relates to a trailer adapted to be drawn by an automobile and comprises a unique combination of a tent and beds particularly conceived for camping purposes to overcome the many objectionable features heretofore found in the camping trailer offered to the public.

It is the primary object of this invention to provide a camp trailer in which is combined a tent of sufficient height to permit the camper to stand erect within, and beds within the tent of the full standard width of fifty-four inches and the regulation length, such tents and beds being so mounted and carried on the trailer as to be set up or taken down easily by one camper alone with the minimum motions, and being of such construction as to permit collapsing to a condensed form, particularly low in height, so as to permit a rear vision of the road behind the trailer from the automobile drawing it.

Other objects will be readily apparent from the following description of one particular embodiment of the invention, reference being had to the accompanying drawings, in which—

Figure 3:
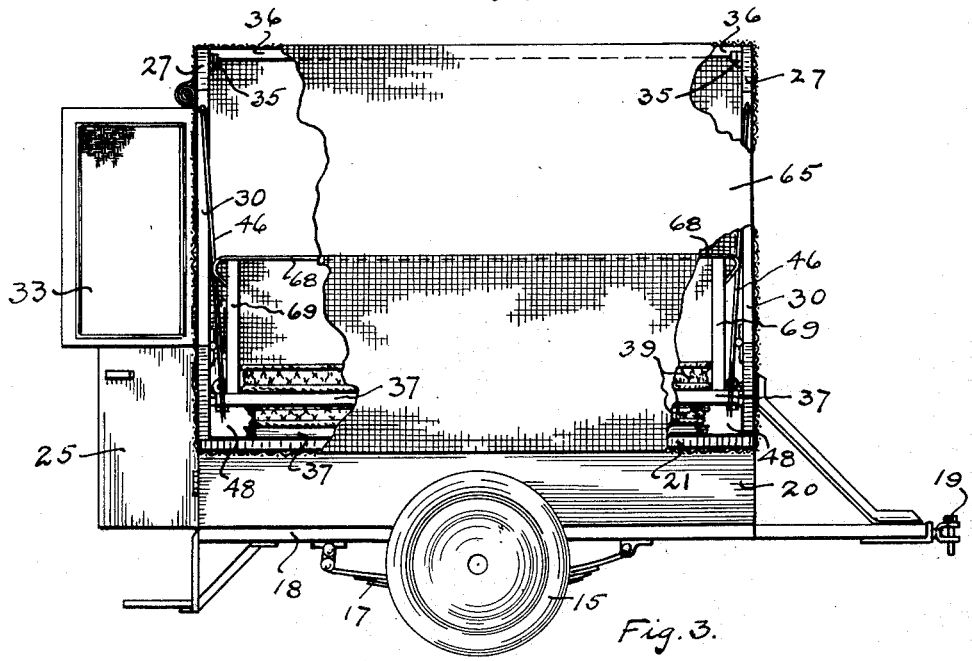

Fig. 1, is a rear elevation of the trailer in an erected position;

Fig. 2, a fragmentary top plan view of the trailer in the same position;

Fig. 3, a fragmentary side elevation of the trailer in the same position.

Figure 7:
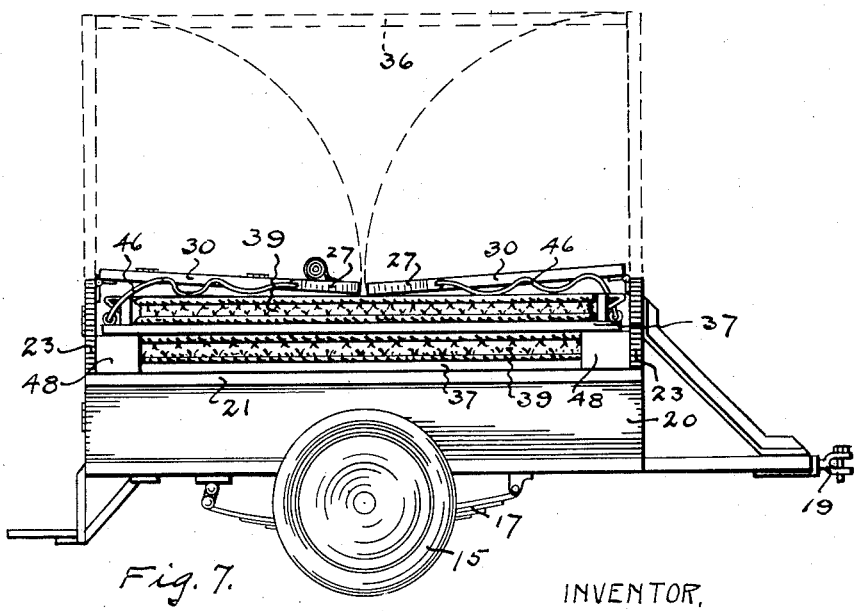

Fig. 4, a vertical transverse section through the erected trailer on the line 4—4 in Fig. 2;

Fig. 5, a vertical transverse section on the line 5—5 in Fig. 2;

Fig. 6, a vertical transverse section through the trailer on the line 4—4 in Fig. 2, but with the beds drawn to the center of the trailer;

Fig. 7, a side elevation of the trailer corresponding to that of Fig. 3, but in a collapsed position, and the tent covering removed for the sake of clearness;

Fig. 8, a rear elevation of the trailer in a collapsed position, with the lower door opened;

Fig. 9, a vertical section on the line 9—9 in Fig. 4, showing a detail of a bed support;

Fig. 10, a side elevation of an upper bed retaining latch;

Fig. 11, a top plan view of the upper latch;

Fig. 12, a side elevation of the lower bed retaining latch.

Fig. 13, a top plan view of the lower bed latch, and

Fig. 14, a vertical section through the lower bed latch on the line 14—14 in Fig. 12.

Like characters of reference indicate like parts throughout the several views in the drawings.

The trailer is carried by the two rubber-tired wheels 15, the transverse connecting axle 16 and the two springs 17 which are attached to the floor 18. The trailer is adapted to be connected to an automobile by means of the coupling yoke 19. In practice, I employ an adjustable bracket depending from each corner of the floor 18 as a means of preventing the trailer from tilting about the axle 16 when the trailer is detached from the drawing automobile, but as such brackets are subject matter of a separate invention they are not here shown.

A box bed is built up from the floor 18 by the two vertical side walls 20, from the top of each of which walls 20, extends a horizontal flare board 21. A bent is formed across and above the two flare boards 21 at the front by the top rail 22 and the supporting posts 23, and the entire end is enclosed preferably by the light sheet metal plate 24 within the boundaries of the rail 22, the posts 23, the flare boards 21, the side walls 20, and the floor 18.

The rear end is formed similarly in shape to the front end, but has the lower door 25 fitted therein hinged by one side to open throughout the entire height of the bed proper above described, the top rail of the rear bent being in the two sections 26 separated by the door 25.

Hinged to the front top rail 22, so as to swing inwardly and downwardly, is a frame having the triangular shaped head 27, the vertical posts 28, defining a window 29 therebetween, and the braces 30 being securely united to the lower rail 31.

Similarly, a corresponding frame is hinged from the rear top rail sections 26 to swing inwardly. This rear frame, however, has its lower rail in the two sections 32, so as to permit the swinging of the upper door 33 between the posts 28, whereby this door 33 may contact and be secured to the lower door 25 by the thumb latch 34, so that the two doors may be operated as a single door unit if desired.

On the inner side of each head 27 is mounted a socket 35 to receive therein the ends of the removable ridge pole 36, which pole serves as a means of spacing apart and holding the two hinged end frames, as above described, in upright parallel positions, as indicated in Figs. 2 and 3.

In the trailer here shown, two sleeping beds are employed. Each bed is formed of a rectangular steel frame 37 carrying the usual spring construction 38 therein to support a mattress 39 thereon. Referring particularly to Figs. 2, 4, 6, and 9, these beds are uniquely carried between the ends of the trailer by double flanged casters 40 pivotally secured to the ends of the arms 41 which extend from the inner corners of the bed frames 37, the casters 40 being engaged between an upper track 42 and a lower track 43 to cary one bed, and similar tracks 44 and 45 for the other bed, the two pairs of tracks being so located as to permit one bed to pass under the other bed as both beds are moved to center over the body of the trailer as in Fig. 6.

The bed thus carried in the lower position, being the right hand one in Fig. 4, having its inner side supported by the casters 40 at either end in the tracks 44 and 45, projects outwardly to rest by its frame 37 horizontally across the flare board 21, and has the cables 46, one extending from each head 27 to the ends of the outer rail of the frame 37 (Figs. 3 and 4). The cables 46 serve not only as means of limiting the outward travel of the bed frame 37 but also as means of securely supporting the frame 37 in its outermost position as in Fig. 4, the support of the frame 37 in any intermediate position being taken entirely by the flare board 21 since the frame 37 cannot tip downwardly by reason of the casters 40 being engaged between the tracks 44 and 45.

The other bed adapted to be pulled outwardly to the left, Figs. 4 and 6, is maintained in a horizontal position by means of the frame 37 resting across the blocks 48 mounted upon the flare board 21, over which blocks the frame 37 may be slid to the outermost position as limited by the cables 49, one from each head 27 to the respective end of the outer rail of the frame 37.

However, neither bed will of itself remain in the outermost position by reason of the inward pull of the cables 46 and 49, and I provide latches generally designated by the numerals 50 and 51 which automatically engage against the casters 40 when both beds are moved to the extreme outer positions. Reference to Figs. 10, 11, 12, 13, and 14 is had in describing such latches.

The latch 50 is mounted to operate against the casters 40 of the upper frame 37 and comprises a latch bar 52 pivotally carried by the bracket 53 having the overhanging guide 54. This latch 50 is mounted immediately above the upper track 42 so that the latch bar 52 may fall by gravity down across the face of the track 42 whereby as the caster 40 moves along toward the outer position it lifts the bar 52, as indicated by the dash lines in Fig. 10, to permit the bar 52 to then drop down behind the caster 40 when it reaches its outermost position, and the latch bar 52 must then be lifted by hand to permit the inward travel of the bed. A stop 55 extends over the track 42 to limit the downward travel of the bar 52.

The latch 51 comprises a latch bar 56 pivotally carried by the bracket 57 to swing upwardly over the side of the lower track 45, and the bar 56 is normally held with its caster engaging end upward by means of the spring 58 interconnecting the other end of the bar with the lower end of the bracket 57. A portion 59 of the bracket 57 limits the travel of the bar 56 due to the pull of the spring 58. As the caster 40 comes outwardly along between the tracks 44 and 45, the caster 40 depresses the bar 56 as indicated by the dash lines, Fig. 12, to permit the bar 56 to fly up and contact the caster 40 from behind when the caster 40 reaches its outermost position. The bar 56 must be pushed down by hand to permit the bed to travel inwardly.

Two upper latches 50, one on each end, and two lower latches 51, likewise one at each, end are employed.

Particular attention is directed to the construction of the casters 40 and the tracks within which they are engaged. Each caster 40 has the inner flange 60 and the outer flange 61 with the reduced section 62 therebetween interconnecting the two flanges, and, as the tracks 42 and 43 (Fig. 9) extend between the flanges 60 and 61, above and below the section 62 respectively, it will be seen that caster 40 cannot be displaced sideways, nor upwardly nor downwardly. The two ends of the trailer are thus tied together through the bed frames 37 by means of the casters 40 so being engaged, and neither bed will drop to the ground when in an outer position, since the frames 37, either fulcruming over the flare board 21 or the blocks 48 as the case may be, are always supported by the casters 40 along the same respective horizontal lines as determined by the tracks.

Suitable material, such as canvas or drill 65 is passed over the ridge pole 36 to form a tent-like enclosure entirely over around and under the two beds and is tightly secured along the edge of the flare boards 21 and to the fixed and hinged ends to completely enclose each end. Windows 66 and 67 may be provided as desired and the upper door 33 is preferably covered with a net to permit passage of air but to exclude bugs. The tent being so formed provides a tight enclosure and provides full protection against entrance of bugs and vermin and against all sorts of weather.

To shape the tent and give ample room over the beds, each frame 37 carries a tent support rod 68 fixed across the ends of the bars 69. The bars 69 are pivotally secured to the side rails of the frames 37, so that when the tent is to be collapsed, the bars 69 may be swung inwardly and down along the mattresses, as indicated by the dash lines in Fig. 4. To hold the bars 69 in the upright positions to carry the rods 68 out against the tent, braces 70 are pivotally secured to the side rails of the frames 37 to swing out against the posts 69 to engage under suitable retaining lugs 71.

Assuming the trailer to be in its erected position, as in Fig. 1, and it is desired to prepare it for travel, the braces 70 are first swung back inwardly along the frame 37 side rails to rest in their receiving brackets 72 and the rods 68 are swung down upon the respective mattresses. The two upper latches 50 and the two lower latches 51 are operated to release the two frames 37 which at once move inwardly slightly. Then going to the outside of the trailer, both frames 37 are pushed inwardly to be completely within the flare boards 21 as in Fig. 6, whereupon the tent material 65 drops downwardly on each side as there indicated. Both doors 25 and 33 are opened and the ridge pole 36 may be lifted out of its sockets between the heads 27 and laid upon the top mattress. Both the front and rear upper framed sections may then be swung downwardly, as in Fig. 7, and the tent material hanging down over the sides may be thrown up across over the trailer, which is then in the condition as indicated in Figs. 7 and 8.

The lower door 25 may be opened at will even when the trailer is so prepared for the road so that access may be had to the space below the lower frame 37 above the floor 18. While the tracks 42, 43, 44 and 45 extend across the door 25, they are broken at the door edges to permit opening of the door when the frames 37 are positioned to have the casters 40 beyond the door edges.

As one bed slides under the other, the bedding on either bed does not have to be disturbed, and the rods 68 when folded down hold the bed clothing and mattresses in place. There is no lifting of beds nor swinging of beds over on to each other. By placing the casters 40 out on the ends of the arms 41 at substantial distances from the frame 37, there is no interference of the casters 40 with any bed clothes that may hang over the edges of the mattresses. The construction so described is extremely simple and is exceedingly light in weight, both highly desirable features in a camping outfit.

I claim:

1. In a camp trailer, a floor, fixed ends projecting from the floor, an upper end fixed to each of said fixed ends adapted to swing inwardly toward each other, a bed slidingly retained between said fixed ends whereby the bed may be pulled horizontally out to extend beyond and give access to the floor, a support permanently extending from the floor to under the bed to maintain the bed in a horizontal position while being moved in or out from the floor, means of limiting the outward travel of the bed, and a woven covering secured to said fixed and hinged ends passed over, around, and under said bed to form a complete tent enclosure when the bed is extended beyond the floor, said covering being adapted to be folded over the bed when the bed is positioned over the floor and the hinged ends are swung downwardly onto the bed.

2. In a camp trailer, the combination of a floor, side walls extending from the floor, supports permanently extending outwardly from the side walls, a fixed front end extending above said supports, a fixed rear end similar to said front end, an upper front end hingedly carried along the top of said fixed front end, an upper rear end hingedly carried on the top of said fixed rear end, a bed carried between said fixed ends, a guide carried on each end of said bed, tracks secured to said fixed ends to engage said guides, said bed being adapted to slide over one of said supports to a position in which the bed projects beyond the floor substantially the width of the bed, a second bed carried between said fixed ends above said first bed, a guide carried on each end of the second bed, tracks secured to said fixed ends to engage said second bed guides, said second bed being adapted to slide over the other of said supports over which it may slide to an outer position to project substantially its entire width beyond the said floor, said tracks maintaining said beds in horizontal positions in cooperation with said supports.

3. In a camp trailer, having a body with sides and front and rear ends, a bed unit comprising a bed frame normally supported at one side by the body side and positioned above the body, an arm extending beyond each bed frame end from near the opposite frame side, a roller rotatably carried in each arm, said roller having an outer flange and an inner flange with a reduced bearing section therebetween, tracks secured to said body ends entering between said roller flanges from below and above, said tracks serving as supporting guides for the inner side of the bed frame as it is slid over the body edge to an overhanging position, an upper body frame hinged to each trailer body end adapted to be swung upwardly and outwardly from over the bed frame to an upright position, a flexible cable secured to near the top of each of said hinged upper frames and attached to near the outer side of the bed frame, said cables being of proper length to limit the travel of the bed frame to the desired outward position and there support the outer side of the bed frame, and stops automatically engaging against said rollers upon the bed frame reaching that position.

4. In a camp trailer, having a body with sides and front and rear ends, a bed unit comprising a bed frame normally supported at one side by the body side and positioned above the body, an arm extending beyond each bed frame end from near the opposite frame side, a roller rotatably carried in each arm, said roller having an outer flange and an inner flange with a reduced bearing section therebetween, tracks secured to said body ends entering between said roller flanges from below and above, said tracks serving as supporting guides for the inner side of the bed frame as it is slid over the body edge to an overhanging position, an upper body frame hinged to each trailer body end adapted to be swung upwardly and outwardly from over the bed frame to an upright position, a flexible cable secured to near the top of each of said hinged upper frames and attached to near the outer side of the bed frame, said cables being of proper length to limit the travel of the bed frame to the desired outward position and there support the outer side of the bed frame, and stops automatically engaging against said rollers upon the bed frame reaching that position, and a rod extending longitudinally across said bed frame, a post hinged to each end of the bed frame and secured by their upper ends to the rod whereby said rod may be swung upwardly and outwardly from a retaining position over said bed frame, and members to engage said posts in substantially upright positions.

5. In a camp trailer, a trailer body having sides and front and rear ends, a bed frame slidingly carried by the body to permit the bed frame being pulled out over one of the body sides, means maintaining said bed frame in substantially a horizontal position during such travel, an upper end hinged to the front body end, an upper end hinged to the rear body end, each of said upper ends being adapted to be swung from substantially horizontal positions over the body to erect positions as vertical extensions of the respective body ends, means for maintaining the said upper ends in the erect positions, and a cable extending from each of said upper ends to the bed frame to limit the outward travel of the bed frame, and latches automatically operating to maintain said bed frame in a predetermined outward position against the inward pull of said cables.

6. In a camp trailer, having a body with sides and front and rear ends, a bed unit comprising a bed frame normally supported at one side by the body side and positioned above the body, an arm extending beyond each bed frame end from near the opposite frame side, a roller rotatably carried in each arm, said roller having an outer flange and an inner flange with a reduced bearing section therebetween, tracks secured to said body ends entering between said roller flanges from below and above, said tracks serving as supporting guides for the inner side of the bed frame as it is slid over the body edge to an overhanging position, and an upper body frame hinged to each trailer body end adapted to be swung upwardly and outwardly from over the bed frame to an upright position.

7. In a camp trailer, having a body with sides and front and rear ends, a bed unit comprising a bed frame normally supported at one side by the body side and positioned above the body, an arm extending beyond each bed frame end from near the opposite frame side, a roller rotatably carried in each arm, said roller having an outer flange and an inner flange with a reduced bearing section therebetween, tracks secured to said body ends entering between said roller flanges from below and above, said tracks serving as supporting guides for the inner side of the bed frame as it is slid over the body edge to an overhanging position, and an upper body frame hinged to each trailer body end adapted to be swung upwardly and outwardly from over the bed frame to an upright position, and a door in said body rear end, said door removing said rear end tracks from across its opening upon the door being swung to an open position.

8. In a camp trailer, having a body with sides and front and rear ends, a bed unit comprising a bed frame normally supported at one side by the body side and positioned above the body, an arm extending beyond each bed frame end from near the opposite frame side, a roller rotatably carried in each arm, said roller having an outer flange and an inner flange with a reduced bearing section therebetween, tracks secured to said body ends entering between said roller flanges from below and above, said tracks serving as supporting guides for the inner side of the bed frame as it is slid over the body edge to an overhanging position, and stops automatically engaging against said rollers upon the bed frame reaching a predetermined outward position.

9. In a camp trailer, a trailer body having front and rear ends, tracks carried on the ends, an upper bed frame, a lower bed frame, members from each of said bed frames engaged by said tracks, fixed supports carried by the trailer body to carry the respective outer sides of the two said bed frames, said track-engaging bed-frame members supporting the respective inner sides of the two said bed frames, whereby said bed frames may be pulled horizontally out from over the body, one to one side and the other to the opposite side, on said tracks and said supports to fulcrum over said supports in cooperation with said tracks, and a door in one of said body ends, said door removing the tracks from across the door opening upon opening the door.

10. In a camp trailer, a trailer body having front and rear ends, an upper bed frame, a lower bed frame, tracks carried on each of said ends, and members extended from said bed frames to engage said tracks whereby said bed frames may be moved horizontally one over the other along said tracks, said bed-frame members being so engaged by said tracks as to tie the front and rear body ends together through said bed frames to prevent longitudinal displacement of said body ends in respect to each other.

11. In a camp trailer, a trailer body having front and rear ends, tracks carried on the ends, an upper bed frame, a lower bed frame, members from each of said bed frames engaged by and held against vertical displacement from said tracks, supports carried by the trailer body to carry the respective outer sides of the two said bed frames, said track engaging bed-frame members supporting the respective inner sides of the two said bed frames whereby said bed-frames may be slid horizontally out from over the body one to one side and the other to the opposite side on said tracks and said supports to fulcrum over said supports in cooperation with said tracks.

In testimony whereof I affix my signature.

EDWARD RAY GILKISON.